Feb. 24, 1959 J. A. HAMM, JR 2,874,672

MECHANISM FOR AIDING AND DIALING TELEPHONE NUMBERS

Filed May 28, 1957

INVENTOR.
JOHN A. HAMM JR.
John A. Hamm Jr.

United States Patent Office 2,874,672

Patented Feb. 24, 1959

2,874,672

MECHANISM FOR AIDING AND DIALING TELEPHONE NUMBERS

John A. Hamm, Jr., Cantonment, Fla.

Application May 28, 1957, Serial No. 662,233

1 Claim. (Cl. 116—133)

This invention relates to communications apparatus and more particularly to a device for tabulating telephone numbers.

It is an object of the present invention to provide a device that can be used for tabulating telephone numbers from any telephone book for ready reference while dialing a number.

Another object of the present invention is to provide a device of the above type that is self-contained and includes a series of lettered and numbered dials or rollers which have indicia corresponding to that carried on most telephone dials.

Other objects of the invention are to provide a tabulating device bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which.

Figure 1:
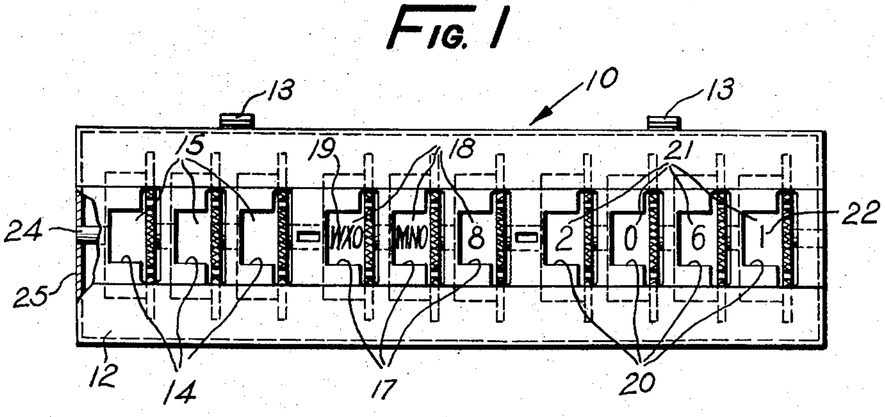
Figure 1 is a front plan view of a device made in accordance with the present invention.

Referring now more in detail to the drawing, a device 10 made in accordance with the present invention is shown to include a housing 12 that has a plurality of spring clips 13 secured thereto for supporting the housing 12 from a telephone. The housing 12 is provided with several series of similar spaced, parallel, side by side window openings, each of which is provided with a roller having indicia thereon for purposes hereinafter described. The first series of window openings 14, called the station-to-station series, is used to indicate primarily long distance numbers. A separate roller 15 disposed within each of the first series of window openings 14 has suitable indicia thereon for indicating the long distance location. The next series of window openings 17, called the exchange series, is provided with rollers 18 upon which indicia 19 are imprinted around the circumference of the roller for registry within the window openings. These indicia 19 are similar to those found on ordianry telephone dials. The next series of window openings 20, called the party series, is also provided with rollers 21, each of which bears a complete series of numbers that are circumferentially spaced around the roller, of the type found on ordinary telephone dials.

Figure 3:
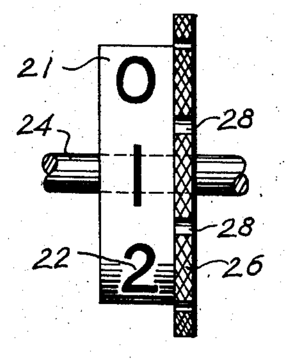
Figure 3 is an enlarged front elevational view of one of the operating elements.
Figure 2:
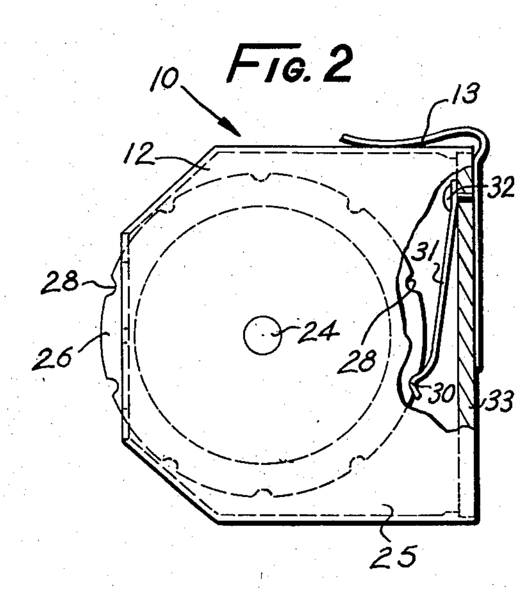
Figure 2 is an enlarged end view, with parts broken away, of the device shown in Figure 1.

All of the rollers 15, 18, 21 are rotatably supported upon a common shaft 24 rotatably carried in the end walls 25 of the housing 12. As is shown in Figure 3, a knurled disc 26, integral with the roller 21 and of slightly larger diameter, extends through enlarged portions of the respective window openings for actuation by hand. With reference to Figure 2, it will be noted that the disc 26 is provided with a series of circumferentially spaced indents, each one of which corresponding to one of the indicia 22 imprinted upon the roller 21. A spring finger 31 secured at one end to the rear wall 33 of the housing, such as by a rivet 32, is provided with a lug 30 at its opposite end that is adapted to extend into the indents 28 as the disc 26 is rotated. Thus, the lug 30 acts as a detent for cooperation with the indents 28 to releasably secure the rollers in any desired position.

In use, any phone number found in a telephone book can be reproduced upon the device 10 by rotating each of the discs 26 so as to bring the proper indicia into the respective window openings. Thus, by following the indicia so arranged, the telephone number may be easily dialed without having to write the number down or attempt to remember it. Of course, the housing may be attached to any desired support or may be kept in a drawer for future use, the last number used always remaining intact upon the face of the housing for ready reference. It will be recognized that a small steel ball supported within a housing for reciprocating movement by a light compression spring for engagement with the indents 28 on the disc 26 could be substituted for the spring finger 31, if desired. Since this would eliminate friction, it would facilitate the selection of the proper indicia on each wheel, the ball riding along the rim of the disc and dropping into each hole for each number as the disc is rotated.

While various changes may be made in the detail construction, it shall be understood that such changes shall be within the spirit and scope of the present invention as defined by the appended claim.

What I claim as new and desire to protect by Letters Patent of the United States is:

A complete self-contained manually operable tabulating device adapted to be mounted upon a telephone which supports a conventional dialing mechanism thereon and the dialing mechanism embodying a rotative dial containing a series of symbols thereon, comprising, in combination, an elongated prismatic housing, said housing having a plurality of longitudinally aligned discrete window openings in spaced apart side by side parallel relationship, each one of said window openings being spaced from the next adjacent window opening by a riser, each of said window openings terminating at one end adjacent a riser with a narrow vertical enlargement, a plurality of indicia bearing means having symbols thereon corresponding to the symbols on the dial of the telephone rotatably supported within said housing adjacent to each one of said window openings, operating means for effecting rotation of said indicia bearing means to predetermined positions with respect to each said window opening, a shaft common to all of said indicia bearing means, each of said indicia bearing means comprising a roller rotatably supported upon said common shaft, said common shaft being rotatably supported at each opposite end upon opposite end walls of said housing, said rollers being independently rotatable thereon, said operating means comprising a separate knurled circular disc integrally secured with each of said rollers, and each of said discs being of larger diameter than its integrally secured roller and having the peripheral edge thereof extending outwardly through said narrow vertical enlargement of adjacent window opening and beyond the confines of said housing immediately adjacent to said associated riser, the peripheral edge of each of said discs comprising a plurality of circumferentially spaced apart indents, and said operating means further comprising a spring detent secured within said prismatic housing having an outwardly extending lug for releasable engagement with selective ones of said indents in response to each said roller and disc assembly; whereby the device automatically displays therewith symbols in longitudinal alignment.

References Cited in the file of this patent

UNITED STATES PATENTS

| | | |
|---|---|---|
| 768,689 | Pali | Aug. 30, 1904 |
| 1,581,374 | Youngs | Apr. 20, 1926 |
| 1,720,085 | Meyers | July 9, 1929 |
| 1,920,844 | Curry | Aug. 1, 1933 |
| 2,021,236 | Greattinger | Nov. 19, 1935 |
| 2,570,535 | Faber | Oct. 9, 1951 |
| 2,612,133 | Crawford | Sept. 30, 1952 |